United States Patent [19]

Lewis

[11] Patent Number: 5,592,333
[45] Date of Patent: Jan. 7, 1997

[54] DEVICE FOR OPTICALLY ROTATING LIGHT BEAMS IN A BEAM ARRAY

[75] Inventor: John R. Lewis, Acton, Mass.

[73] Assignee: Polaroid Corporation, Cambridge, Mass.

[21] Appl. No.: 678,150

[22] Filed: Jul. 11, 1996

Related U.S. Application Data

[63] Continuation of Ser. No. 283,225, Jul. 29, 1994, abandoned.

[51] Int. Cl.$^6$ .......................... G02B 27/10; G02B 27/30; G02B 6/02

[52] U.S. Cl. .......................... 359/628; 359/619; 359/641; 385/123; 385/124

[58] Field of Search .................................. 385/123, 124, 385/125, 126, 127, 146, 147; 359/625, 628, 741, 619, 641; 372/6, 7, 8, 109

[56] References Cited

U.S. PATENT DOCUMENTS

| 4,428,647 | 1/1984 | Sprague et al. | 350/167 |
| 4,763,975 | 8/1988 | Scifres et al. | 350/96.15 |
| 5,168,401 | 12/1992 | Endriz | 359/625 |
| 5,268,978 | 12/1993 | Po et al. | 385/33 |
| 5,303,322 | 4/1994 | Winston | 385/146 |
| 5,319,496 | 6/1994 | Jewell et al. | 359/741 |
| 5,418,880 | 5/1995 | Lewis | 385/123 |

FOREIGN PATENT DOCUMENTS

421810A2  4/1991  European Pat. Off. .......... G02B 5/12

Primary Examiner—Georgia Y. Epps
Assistant Examiner—Ricky Mack
Attorney, Agent, or Firm—Joseph Stecewycz

[57] ABSTRACT

An optical apparatus for converting an incoming array of light beams by interchanging the horizontal and vertical components of each beam, the apparatus having a series of grooves, one groove for each incoming beam, where each groove comprises two reflecting surfaces: a first reflecting surface operating to intercept the corresponding beam and reflect it to a second reflecting surface along a first path of travel, that is folded with respect to the incoming beam's direction of propagation, while rotating one of the beam's azimuths, and the second reflecting surface operating to intercept the beam reflected off the first surface and to direct it along a second path of travel, folded with respect to the first path of travel, while rotating the beam's other azimuth.

32 Claims, 10 Drawing Sheets

DEVICE FOR OPTICALLY ROTATING LIGHT BEAMS IN A BEAM ARRAY

CROSS REFERENCE TO RELATED APPLICATIONS

This is a continuation of application Ser. No. 08/283,225 filed on Jul. 29, 1994, now abandoned.

This application is related to the concurrently filed U.S. patent application Ser. No. 283,226, now U.S. Pat. No. 5,533,163, of Martin H. Muendel entitled "Optical Fiber Structure for Efficient Use of Pump Power" and application Ser. No. 283,381, now U.S. Pat. No. 5,418,880, of John R. Lewis et al. entitled "High Power Optical Fiber Amplifier or Laser Device", both commonly assigned herewith.

FIELD OF THE INVENTION

This invention relates to optical systems and, more particularly, to optical devices for converting an array of beams, such as those from a laser array, into a single beam of optical radiation.

BACKGROUND OF THE INVENTION

General Background

Coherent optical radiation, or laser light, is used extensively in communications, medicine, research, imaging, and in many other areas of technology. In such applications, the laser radiation may be used directly or may be used as an intermediate pump source for purposes of promoting amplification or subsequent laser action. When an application's power requirements are small, on the order of several milliwatts more or less, and beam quality is not an overriding concern, laser diodes have been extensively employed because they are directly modulatable and of convenient size and acceptable beam quality. Where modest power is needed, on the order of a watt or so with superior beam quality, such as a diffraction-limited spot, optical fiber lasers with solid state pump sources have been used. For higher power applications where several watts may be needed, as in certain printing applications, use has been made of laser diode arrays as pump sources coupled to special fiber gain structures. For even higher power requirements, ten watts or more, high power laser diode arrays, whose cavities emit a few modes, may be coupled to such specialty gain fibers. However, care must be taken to assure efficient coupling power if maximum power benefit is to be achieved. Since single-mode cores are small, 10 µm or less, and typical materials limit the size of fiber numerical apertures (NA), it is virtually impossible to efficiently couple multimode laser array energy directly into single-mode gain cores via endfire coupling techniques.

As mentioned above, high-power laser light can be obtained by combining the outputs from the emitting cavities of laser diode arrays. However, combining the separate outputs in such a manner that brightness is conserved and power losses are kept to a minimum can be difficult to achieve.

Figure 1:
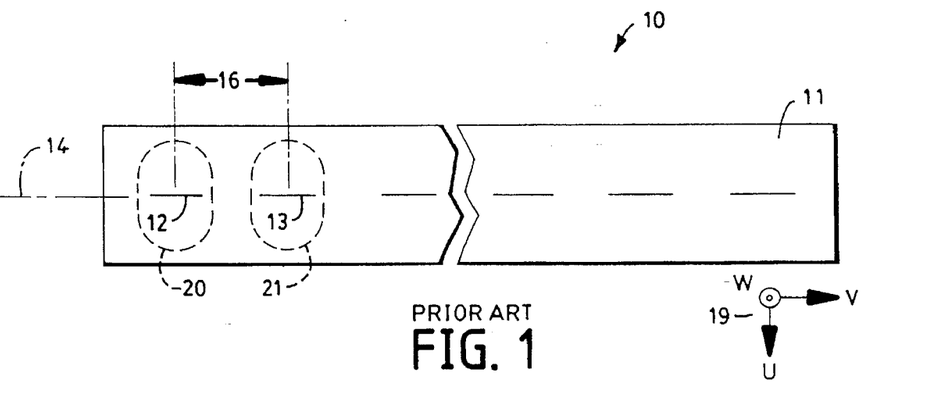
FIG. 1 is a diagrammatic view of the front light-emitting face of a prior art laser bar showing multiple laser diodes arrayed along a laser bar axis.

The difficulty results from the fact that the aggregate output of a multiple laser source is not configured for efficient coupling into an optical fiber due to a mismatch between geometric properties and numerical apertures of the source and the receiving fiber. A typical multiple laser source may be a laser bar 10, as shown in FIG. 1. Optical radiation is emitted from a light-emitting face 11 along which are positioned a plurality of laser cavities. In the example provided, light-emitting face 11 includes a laser diode 12 positioned at an array interval spacing 16 from an adjacent laser diode 13. Laser diode 12 typically has an emitting facet output in the shape of a long, narrow rectangle and is oriented with its long dimension parallel to a laser bar axis 14.

For the purpose of illustration, a set of laser-beam uvw-coordinates 19 is used to describe the propagation characteristics of the beams of radiation emitted from the laser diodes. The orientation of the w-axis is perpendicular to light-emitting face 11 and coincident with the direction of propagation of the beams of radiation. Coordinate set 19 "travels" with each beam, rotating about the w-axis as the beam is rotated, and changing direction as the beam's direction of propagation is changed. Laser diode 12 emits a laser beam 20 and laser diode 13 emits a laser beam 21 and so on.

Figure 2:
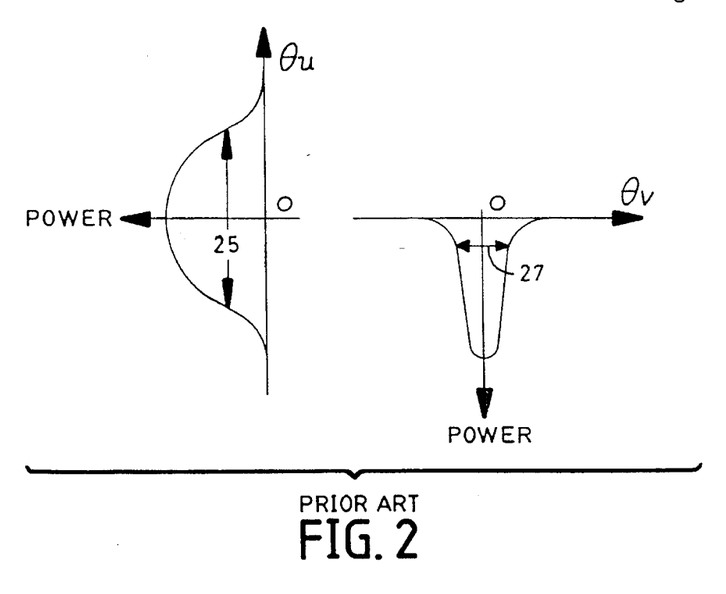
FIG. 2 is a pair of graphs depicting optical power divergence for each laser diode in the laser bar of FIG. 1, where both divergence parallel to the laser bar axis ($\theta_u$) and divergence perpendicular to the laser bar axis ($\theta_v$) are provided.

The radiation distributions of the emitted laser beams 20 and 21 are represented by ellipses to indicate that they each have a v-component parallel to laser bar axis 14 and a u-component perpendicular to laser bar axis 14. A more quantitative representation of the laser beam divergence is provided in the graphical illustration of FIG. 2, which shows that each laser beam diverges at a larger angle $\theta_u$ in the u-direction than the angle of divergence in the v-direction $\theta_v$, as the laser beam propagates in the w-direction. NA values, measured to include 95% of the optical power, are typically 0.30 to 0.70 (17° to 40°) for $NA_u$ and 0.10 to 0.35 (6° to 20°) for $NA_v$. Before such laser beams can be guided into an optical fiber, a coupling device is needed to reformat the radiation into a more suitable configuration that is more compatible with the geometry and the NA of the fiber.

Figure 3:
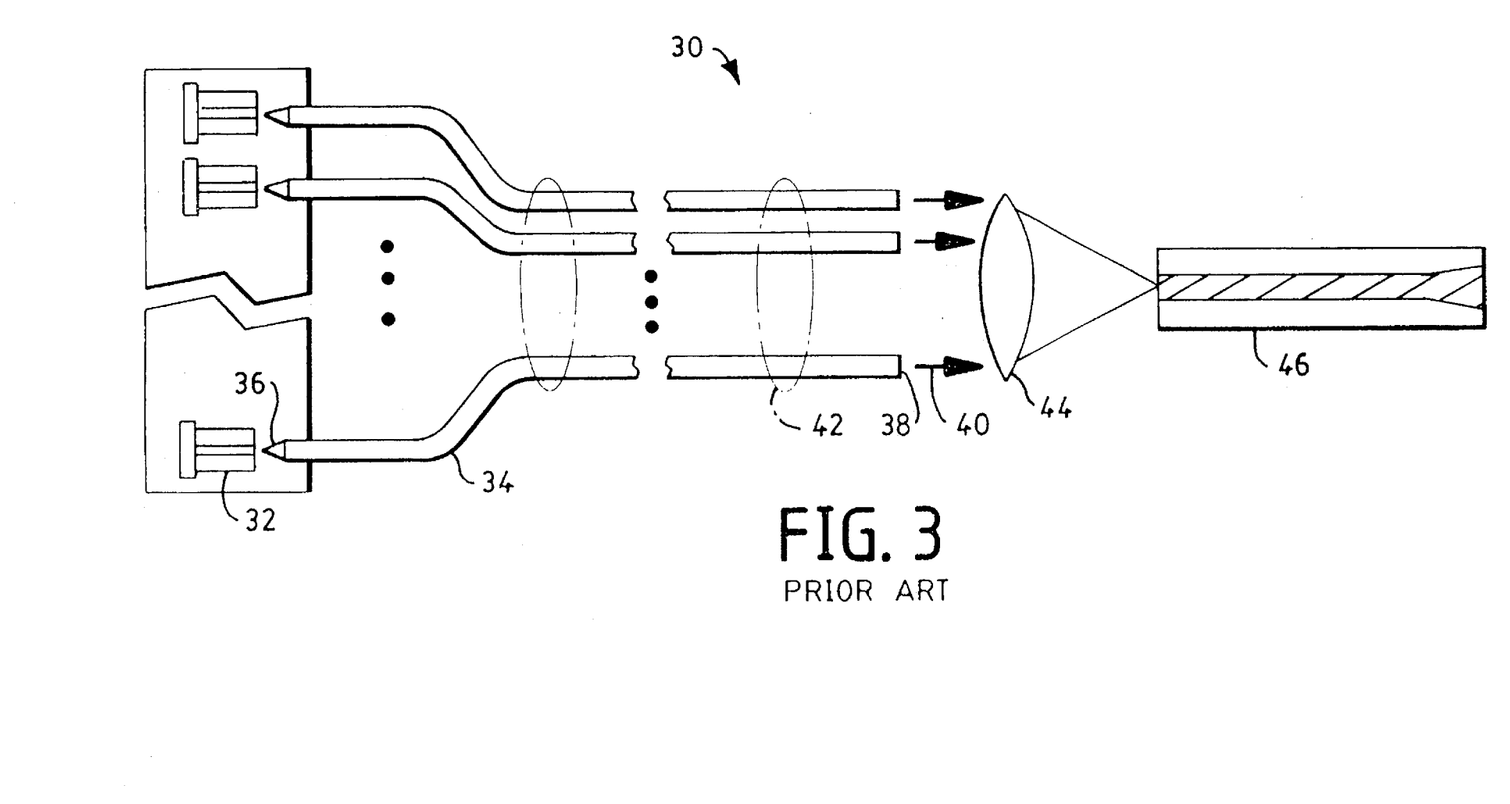
FIG. 3 is a diagrammatic side elevational view of a prior art optical system in which multiple fiberoptic waveguides receive light from a diode laser array and transmit the light to an output end.

One such optical coupler is disclosed in U.S. Pat. No. 4,763,975 to Scifres et. al. FIG. 3 shows an optical system 30 which physically combines the outputs of a plurality of laser light sources 32 by means of a plurality of fiberoptic waveguides 34. Each waveguide 34 has an input end 36 flattened so as to more efficiently couple light from the laser light source 32 to the waveguide 34. The waveguides 34 are then stacked at their output ends 38 to collectively emit a less elongated, stacked light beam made up of the individual light beams 40 emitted from the waveguide output ends 38. A lens 44 or other optical means can be used to couple the stacked light beam from waveguide stack 42 into the cavity mode volume of a solid state laser 46.

U.S. Pat. No. 5,268,978 to Po et al. discloses an optical coupling system, similar to optical system 30, in which the fiber optic waveguides are rectangular in cross section throughout their lengths. An alignment block is used to position the waveguides at their input ends and a lens is used to demagnify and image the aggregate outputs at the opposite, stacked ends into the inner cladding of an optical fiber.

It can be appreciated that these methods of combining laser array outputs by means of a fiberoptic waveguide bundle require precise positioning of each waveguide against the output aperture of each laser light source and introduce some additional loss due to absorption in the coupling fibers. A physical misalignment between any of the waveguide ends and the corresponding laser light sources will proportionately decrease the total power delivered to the solid state laser by the waveguide stack.

A measure of coupling mismatch between two optical components can be provided by a quantitative comparison of the "etendu" values for the two components. The etendu of a component is defined as the mathematical product of the angular extent and the spatial extent of the radiation entering or emitting from that component:

etendu $\triangleq$ [angular extent]×[spatial extent]

To illustrate, assume laser bar 10 to have a linear array of twenty laser diodes on a face 1.00 cm long by 0.1 mm wide. If laser diodes 12 and 13 are one µm in the u-direction and 175 µm in the v-direction, with an array interval spacing 16 of 485 µm center-to-center, $NA_u$ 25 is approximately 0.55 (31.5°) and $NA_v$ 27 is approximately 0.12 (6.9°), as indicated in FIG. 1.

For laser diode 12, the u-component etendu value becomes 1 µm×0.55 NA, or 0.55 µm-NA, and the v-component etendu value is 175 µm×0.12 NA, or 21 µm-NA. For laser bar 10, the u-component etendu is also 0.55 µm-NA. The v-component etendu for laser bar 10 is 1,200 µm-NA, which is more than two thousand times as great as the u-component etendu. In comparison, the inner cladding of an optical fiber might have an NA of 0.47 and a dimension of 120 µm by 360 µm. This would yield an etendu of 56 µm-NA by 169 µm-NA. Direct coupling of a laser bar, such as laser bar 10, into the optical fiber would not be efficient because the v-component etendu of the laser bar exceeds the largest etendu provided by the optical fiber.

This mismatch cannot be corrected solely by the use of anamorphic imaging systems even though they have different spatial magnification in the two orthogonal directions. Any practical imaging system which decreases the etendu mismatch between a laser diode array and an optical fiber must perform more complicated reformatting tasks such as rotating each emitted diode beam by 90° before optical corrections to the beam are made by the imaging system.

U.S. Pat. No. 5,168,401 to Endriz discloses a prism-and-lens array structure for reimaging the outputs of a multiple laser source. A perspective view of the prism-and-lens array structure is provided in FIG. 13 of the reference patent and presented here in FIG. 4, which has been slightly modified for clarity and for purposes of analysis. As shown, prism-lens device 50 is here depicted as it can be used in conjunction with laser bar 10. An xyz-coordinate system 49 has been included to aid in the discussion of prism-lens device 50.

Figure 4:
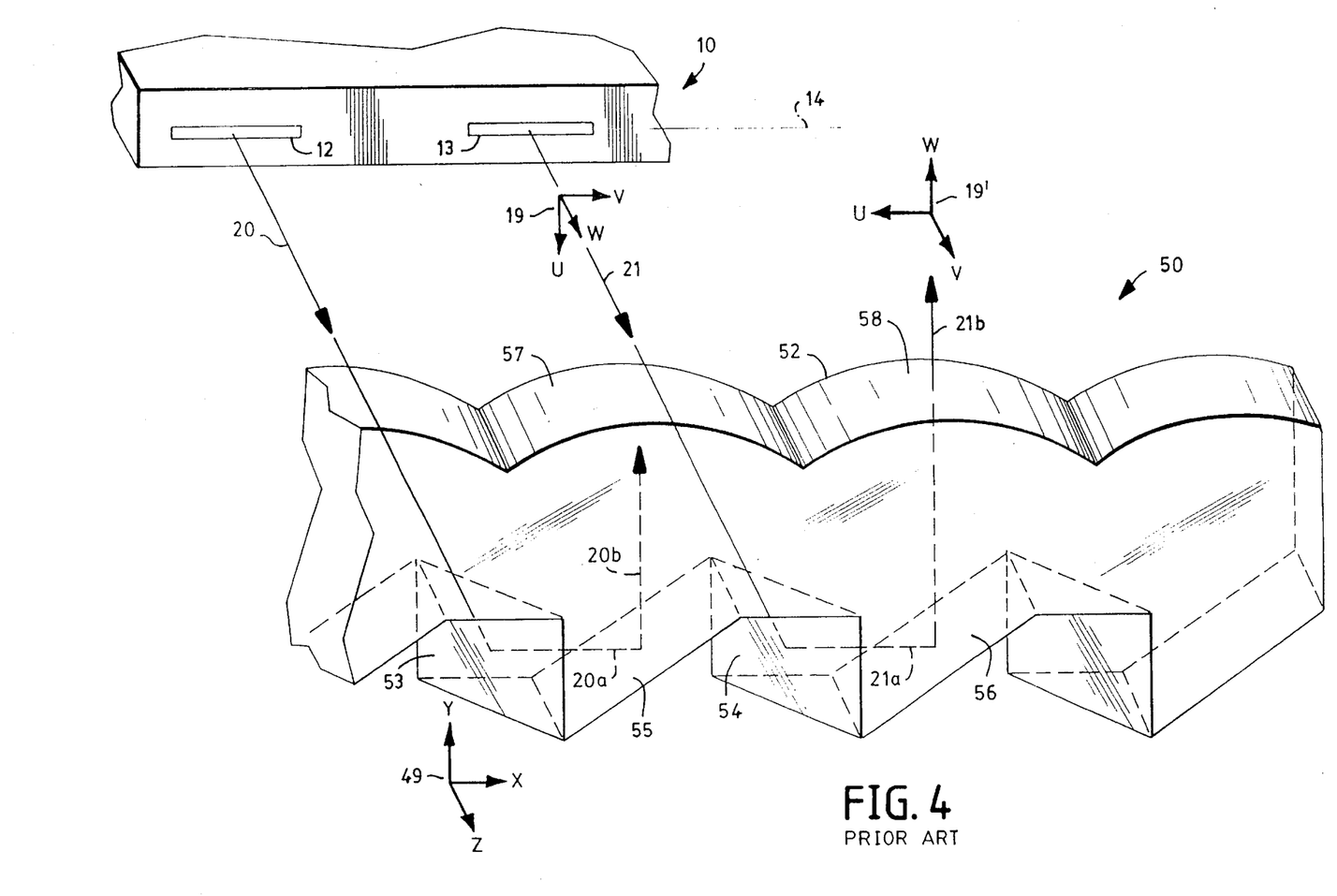
FIG. 4 is a diagrammatic perspective view of a prism structure with microlens array for use in reimaging multiple laser sources in a prior art optical system.

Laser bar 10 is shown oriented so that laser bar axis 14 is parallel to the x-axis and laser beams 20 and 21 propagate in the z-direction. Note that when they are emitted from laser bar 10, laser beams 20 and 21 have their u-components aligned parallel to one another while their v-components are collinear. During operation of the optical system, laser beams 20 and 21 enter prism-lens device 50 through its front surface 52.

Laser beam 21 is incident upon a first reflecting surface 54 oriented at an angle to its direction of propagation. In the example provided, first reflecting surface 54 makes a 45° angle with both the x-y plane and the y-z plane. This produces a reflected laser beam 21a which, in turn, is incident upon a second reflecting surface 56, oriented at an angle to the direction of propagation of laser beam 21a. In the example provided, second reflecting surface 56 makes a 45° angle with both the y-z plane and the x-z plane. This produces a rotated laser beam 21b which passes into a lenslet 58. Lenslet 58 has a curvature only in the x-y plane and acts to collimate rotated beam 21b in the x-y plane.

In a similar sequence, laser beam 20 is incident upon a first reflecting surface 53 which makes a 45° angle with both the x-y plane and the y-z plane. A reflected laser beam 20a is produced and, in turn, is incident upon a second reflecting surface 55 which makes a 45° angle with both the y-z plane and the x-z plane. A rotated laser beam 20b is produced which passes into a lenslet 57. Rotated laser beam 20b emerges from lenslet 57 with its u-component collinear with the u-component of rotated laser beam 21b, and with its v-component aligned parallel to the v-component of rotated laser beam 21b. In this manner, prism-lens device 50 acts to rotate laser beams 20 and 21 by 90° about their respective axes of propagation as a consequence of the two mirror reflections performed on the laser beams and collimates them in one azimuth.

Figure 5A:
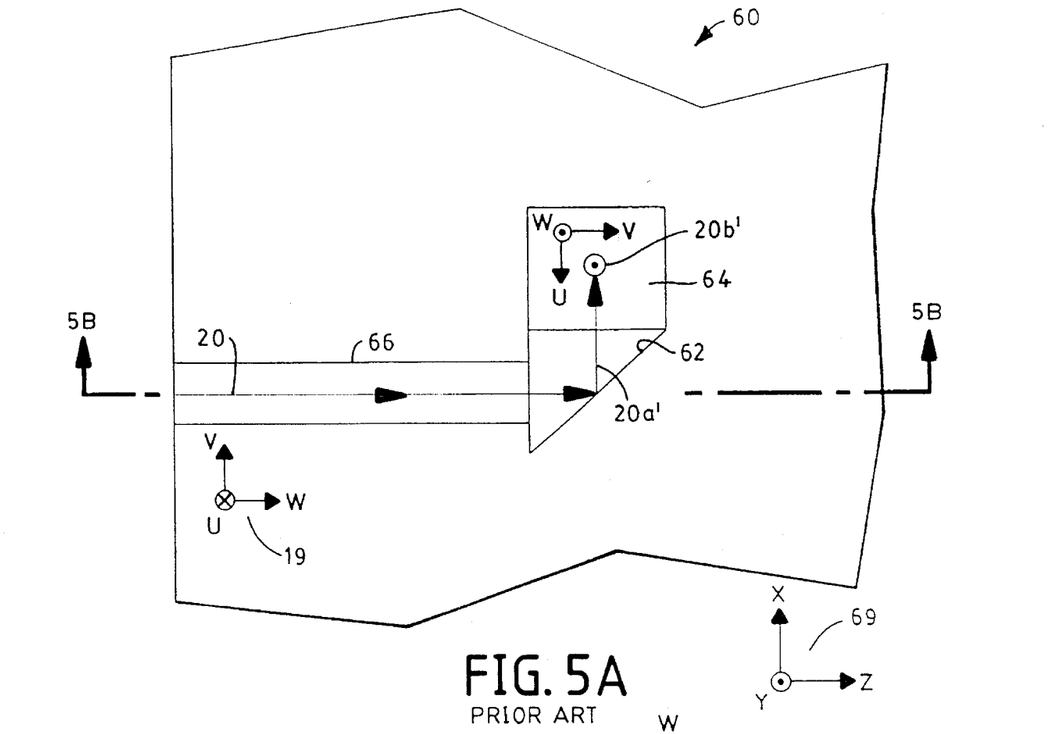
FIGS. 5A and 5B are diagrammatic top and side views respectively of a prior art laser array system with integral laser and reflective elements, used for transforming multiple laser sources.
Figure 5B:
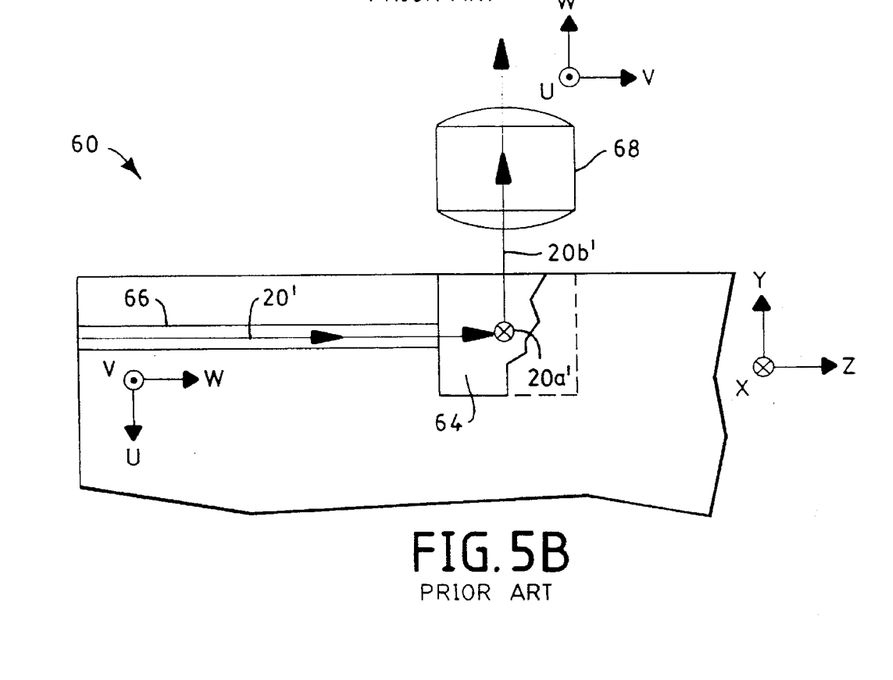

In a second embodiment of the invention disclosed by Endriz, shown in FIGS. 5A and 5B, a first mirror 62 and a second mirror 64 are formed in a monolithic device 60. Monolithic device 60 is used for transforming the outputs of a multiple laser source in a manner similar to that of prism-lens device 50 described above. An incoming laser beam 20', confined within a laser cavity 66, is incident upon a first mirror 62. In the example provided, the direction of propagation of laser beam 20', indicated by the w-axis of a set of laser-beam uvw-coordinates 19', is coincident with the z-axis of an embodiment xyz-coordinate system 69. First mirror 62 is here shown at an angle of 45° to both the x-y plane and the y-z plane. This produces a reflected laser beam 20a', that propagates in the x-direction to strike a second mirror 64. Second mirror 64 is here shown at an angle of 45° to both the x-z plane and the y-z plane. This, in turn, produces a rotated laser beam 20b', propagating in the y-direction, which may then pass into a microlens 68 as shown in FIG. 5B. As can be seen, rotated laser beam 20b' has been rotated 90° about its axis of propagation in a manner similar to the laser beam rotation performed by prism-lens 50 of FIG. 4.

The reference states that prism-lens device 50 can be assembled using precision alignment techniques, and that ion milling and another, more complex, technique are used to fabricate the mirrors in monolithic device 60. It can be appreciated that the embodiments presented above require complex fabrication methods and precise alignment owing to their multi-faceted nature.

Consequently, a need continues for a laser system in which the optical coupler used for reformatting the outputs of a multiple laser source is simpler to fabricate and utilize than prior art devices, and it is a primary object of the present invention to provide such a coupler.

It is another object of the present invention to provide an optical coupler which simply and efficiently combines the outputs of multiple laser sources into a single high-power laser beam.

It is a further object of the invention to provide such an optical coupler which can be formed without the necessity for complex fabrication processes.

It is a further object of the invention to provide such an optical coupler in which the output beam can be efficiently coupled into an optical fiber core.

It is yet another object of the invention to provide an easily-fabricated optical device for usefully modifying a plurality of light beams.

Other objects of the invention will, in part, appear hereinafter and will, in part, be apparent when the following detailed description is read in connection with the drawings.

SUMMARY OF THE INVENTION

A specially-configured, easily-fabricated, multi-faceted surface is used in combination with other elements to combine the outputs from an array of beams so that their combined energy can be efficiently introduced into a gain structure. In the inventive device, the beams from a laser array are collimated, in one axis and combined by an optical coupler, comprised of an optical rotator and an optical system for focusing the individually-rotated laser beams, into a single beam of optical radiation. The optical beam rotator includes a planar strip with a surface having a plurality of adjacent parallel grooves, one groove for each of the laser beams. Every groove is comprised of two reflecting facets forming a dihedral angle with a vertex edge common to both facets. The reflecting facets may be coated to provide a high reflectivity for the laser beams. The vertex edge defines an aspect angle with respect to the direction of propagation of the corresponding laser beam such that the laser beam is rotated about its direction of propagation upon undergoing two sequential reflections from the reflecting facets common to the corresponding vertex edge. In an alternative embodiment, an optically-transparent rotator is used to rotate each laser beam. The optically-transparent rotator provides internally-reflecting surfaces comprising boundaries between the rotator and the ambient medium, where the ambient medium has a lower index of refraction than the material comprising the optically-transparent rotator. The internally-reflective surfaces form a concave reflecting pair having a dihedral angle with an apex edge common to both surfaces. The apex edge defines an aspect angle with respect to the direction of propagation of the corresponding laser beam such that the laser beam is rotated about its direction of propagation upon undergoing two sequential reflections from the concave reflecting pair common to the corresponding apex edge.

BRIEF DESCRIPTION OF THE DRAWINGS

The novel features that are considered characteristic of the present invention are set forth with particularity herein. The organization and method of operation of the invention, together with other object and advantages thereof, will be best understood from the following description of the illustrated embodiments when read in conjunction with the accompanying drawings wherein.

DETAILED DESCRIPTION OF THE INVENTION

Figure 6:
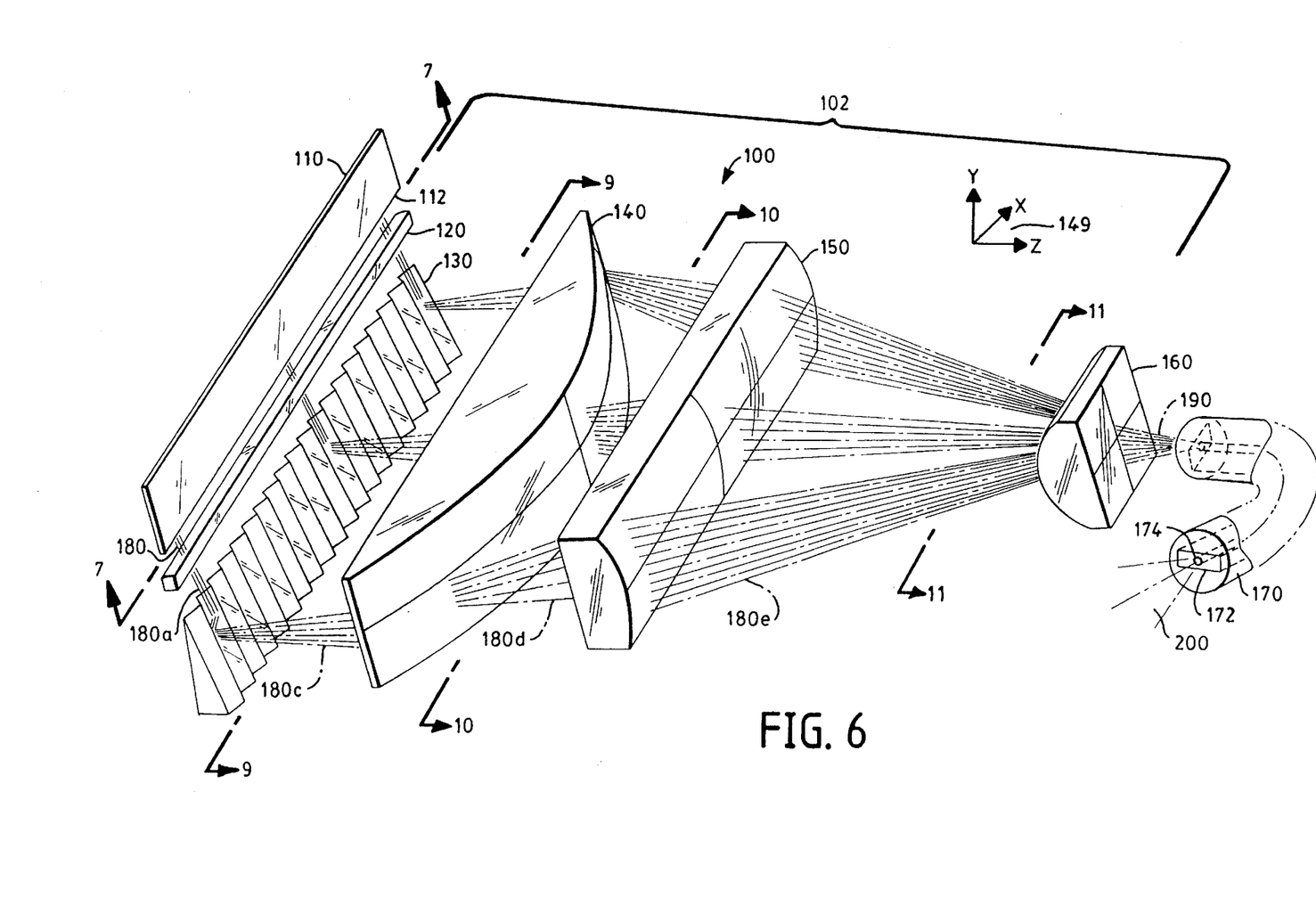
FIG. 6 is a diagrammatic perspective view of an optical system according to the present invention showing a laser bar, a beam collimator, an optical beam rotating device, focusing optics, and an optical fiber.

Referring now to FIG. 6, there is shown a high-power laser system 100 according to the present invention. Laser system 100 is comprised of three major components: a source of radiation 110, an optical fiber 170 with a single-mode core, and a coupling mechanism 102 for directing radiation from source 110 into the optical fiber 170. Source radiation, consisting of multiple laser radiation sources with an aggregate power output of about 20 watts, is converted into a single, well-behaved $TEM_{0,0}$ output of high-density radiation, typically 17 watts at the output end of fiber 170. This configuration makes laser system 100 useful for printing and other imaging applications.

The functions and relative placements of the components of high-power laser system 100 are explained by reference to a set of laser-system xyz-coordinates 149.

Figure 7:
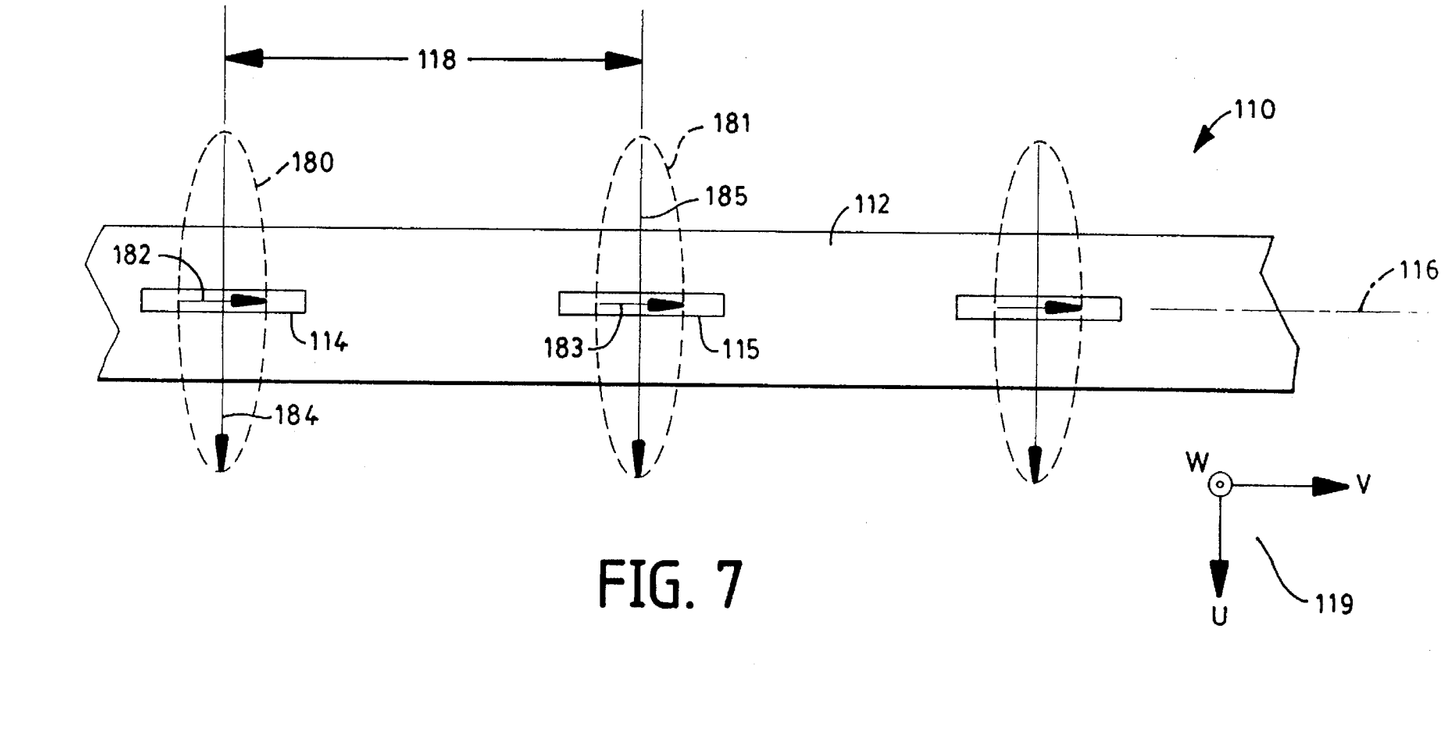
FIG. 7 is a diagrammatic front-elevational view of the light-emitting face of the laser bar of FIG. 6.

The preferred radiation source is a laser bar 110 comprised of an array of laser diodes. A suitable commercially-available laser bar may be of the type available from SDL, Inc., San Jose, Calif. Laser bar 110 has a light-emitting face 112 containing the emitting facets of a linear array of laser diodes distributed along a laser bar axis 116 as shown in FIG. 7. Laser bar axis 116 is oriented parallel to the x-axis of xyz-coordinate system 149, and light-emitting plane 112 is oriented parallel to the x-z plane. Each laser diode in the linear array, such as laser diode 114, for example, has an emitting surface of 175 μm by 1 μm. Array interval spacing, such as the interval 118 between laser diode 114 and an adjacent laser diode 115, is approximately 485 μm center-to-center.

A set of laser-beam uvw-coordinates 119 will be used to facilitate discussion of laser beam propagation. The direction of propagation of any laser diode in the array is aligned with the w-axis of the uvw-coordinates 119. Coordinate set 119 travels with each beam, rotating about the w-axis as the beam is rotated, and changing direction as the beam's direction of propagation is changed. Each laser beam in the beam array has an NA of approximately 0.55 (33.4°) in the u-w plane and 0.12 (6.9°) in the v-w plane. For example, laser diode 114 is shown emitting a laser beam 180, represented by an ellipse, having a v-component 182 and a u-component 184. These emitted laser beams initially propagate in the negative y-direction of the laser-system coordinates 149 and pass into the coupling mechanism 102 of laser system 100 where the laser beams are reformatted. The reformatting process, which is the same for each emitted laser beam in the laser array, will be described for laser beam 180 emitted by laser diode 114.

As shown in FIG. 6, laser beam 180 is first directed into a cylindrical lens 120 which collimates it in a first azimuth, that is, in the u-w plane. Lens 120 has a circular curvature in the y-z plane and serves to collimate laser beam 180 in the y-z plane to yield laterally-collimated laser beam 180*a*. The growth of laser beam 180 in the y-z plane is decreased as it passes through lens 120 and remains decreased as the beam continues to propagate through laser system 100. If desired, lens 120 can be alternatively configured with a hyperbolic or other noncircular surface. A more generally-shaped noncircular collimating lens will introduce fewer aberrations into laterally-collimated laser beam 180*a*, but the positioning tolerances for such a lens would be more critical than the tolerances for a circular lens. Laser beam 180*a* emerges from lens 120 collimated in the u-w plane, but continues to diverge a second azimuth, that is, in the v-w plane.

Laterally-collimated laser beam 180*a* is subsequently rotated 90° along its axis of propagation by means of an optical beam rotator 130. Laser beam 180*a* undergoes two successive reflections off reflecting facets of optical beam rotator 130 to yield a rotated laser beam 180*c*. After passing through optical beam rotator 130, rotated laser beam 180*c* continues to diverge in the v-direction, but remains collimated in the u-direction.

Rotated laser beam 180*c* then passes through a cylindrical steering lens 140 which acts to converge rotated laser beam 180*c* into a converging laser beam 180*d*. Steering lens 140 also acts to converge the entire array of rotated laser beams in the x-z plane. Note that although the array of laser beams is laterally bent towards the z-axis by lens 140, each individual laser beam continues to diverge in the second azimuth.

This divergence of converging laser beam 180*d* is stopped in the second azimuth plane by means of a second cylindrical collimating lens 150. Laser beam 180*d* passes through lens 150 to produce a collimated laser beam 180*e*. The array of collimated laser beams, including collimated laser beam 180*e*, continues to converge in the x-z plane because of the previous passage through steering lens 140.

A focusing lens 160 acts to convert the array of laser beams collimated by second collimating lens 150, including collimated laser beam 180*e*, into a focused beam 190 at a waveguide 172 of an optical fiber 170. Focused beam 190 is approximately 360 μm in size with an NA of 0.47 (28°) in the x-z plane and is approximately 120 μm in size with an NA of 0.47 (28°) in the y-z plane. Optical fiber 170 may be part of an optical amplifier or a fiber laser device.

Collimation of Laser Beams by Collimating Lens 120

Figure 8:
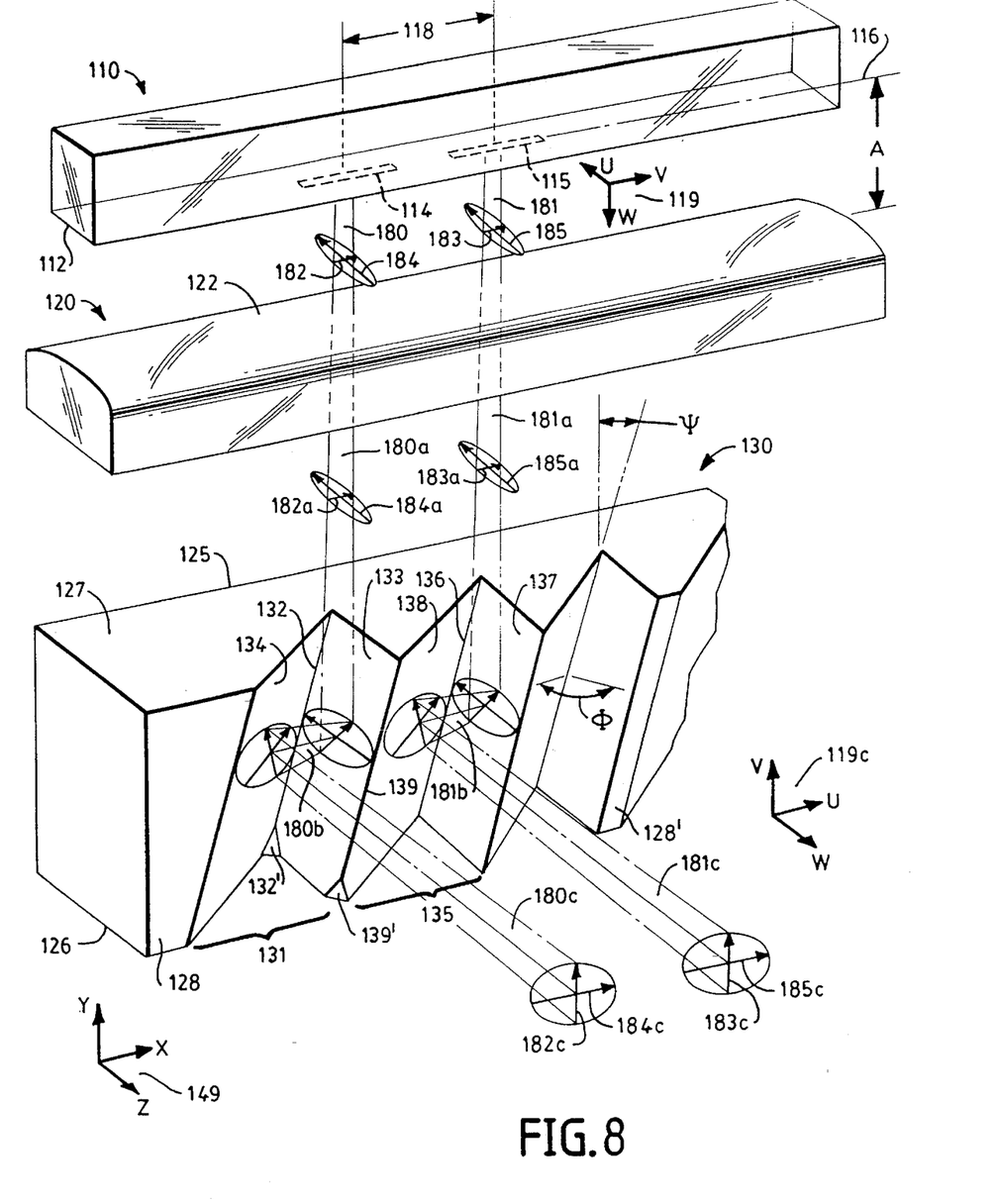
FIG. 8 is a diagrammatic perspective view of a portion of the optical system of FIG. 6 showing the optical beam rotating device reformatting individual laser light sources emitted by the laser bar.

As shown in FIG. 8, laser diode 114 emits laser beam 180 initially in the direction aligned with the w-axis of the uvw-coordinates 119. The spatial distribution of laser beam 180 is represented by an ellipse. Beam divergence in the v-w plane is indicated by the change in v-component 182 and beam divergence in the u-w plane is indicated by the change in u-component 184. Similarly, laser diode 115 emits a laser beam 181, also represented by an ellipse, and beam divergences in the v-w plane and in the u-w plane are indicated by components 183 and 185 respectively. With the emitting region dimensions of 175 μm by 1 μm specified above, laser beams 180 and 181 will each have a divergence, NA, of about 0.12 (6.90°) in the v-w plane and about 0.55 (33.4°) in the u-w plane.

First collimating lens 120 is a cylindrical lens positioned parallel to and approximately the same length as laser bar 110. The focal length of lens 120 is chosen so as to yield a collimated beam of maximum dimension while still passing through an aperture limit set by the geometry of beam rotator 130 as discussed below, such that no occlusion of light occurs. In a preferred embodiment, first collimating lens 120 has a cylindrical surface 122 producing a focal length of 213 μm. The distance from cylindrical surface 122 from light-emitting plane 112, indicated by dimension "A" in the illustration, is selected so that the size of laser beams 180 and 181 at cylindrical surface 122 is approximately 234 μm in the u-w plane. Accordingly, the width of lens 120 is a minimum of 234 μm wide so as to intercept essentially all the radiation emitted by the array of beams.

Laser beam 180 emerges as a laterally-collimated laser beam 180*a* after passing through first collimating lens 120. Because of a number of factors (e.g., circular aberration induced by surface 122, the positional tolerance of laser diode 114 in the u direction, and diffraction effects due to the finite width of first collimating lens 120), laser beam 180*a* continues to grow somewhat in the first azimuth, that is, the u-w plane, but the amount of growth can be small, with NA about 0.002 (0.11°), that it can be ignored, given the other geometry of the system. Laterally-collimated laser beam 180*a* continues to diverge in the v-w plane as indicated by v-component 182*a*, which is shown as being longer than v-component 182. In comparison, u-component 184*a* remains unchanged in length from u-component 184 to indicate that beam 180*a* is essentially collimated in the first azimuth. Similarly, laser beam 181 emitted by laser diode 115 emerges as a laterally-collimated laser beam 181*a* with a growing v-component 183*a*.

Description of Optical Beam Rotator 130

As seen in greater detail in FIG. 8, optical beam rotator 130 is comprised of an array of contiguous vee-shaped grooves, such as groove 131, formed on a front surface 128 of a planar strip 125. Intergroove spacing along optical beam rotator 130 in the x-direction is the same as the laser array interval spacing 118 along the laser bar axis 116. Beam rotator 130 thus provides one groove for each laser diode in laser bar 110. The front surface 128 of planar strip 125 is aligned with the x-axis of xyz-coordinate system 149 such that optical beam rotator 130 receives the linear array of laser beams emitted by laser bar 110. In the example provided, laser beam 180 is emitted by laser diode 114 and is received by a groove 131, and laser beam 181 is received by an adjacent groove 135.

Groove 131 is comprised of a first reflecting facet 133 and a second reflecting facet 134. Reflecting facets 133 and 134 are in opposed relationship to one another and meet at a common line of intersection, vertex edge 132, to form a dihedral angle Φ of 60°. Adjacent groove 131 is groove 135 comprised of a third reflecting facet 137 and a fourth reflecting facet 138 which meet at a vertex edge 136. Reflecting facets 133 and 138 preferably meet at a common line of intersection to form an apex edge 139. Alternatively, the grooves can be made more shallow as needed. Because the intergroove spacing is fixed by the configuration of laser bar 110, the spacing does not change if shallower grooves are used. Accordingly, with shallow grooves apex edges 139 form a plurality of flat, narrow strips, such as strip 128', and comprise a portion of front surface 128.

The grooves are all similarly oriented so that alternating reflecting facets, such as first reflecting facet 133 and third reflecting facet 137, (or second reflecting facet 134 and fourth reflecting facet 138) are parallel to one another. For ease in forming the array of grooves, each groove extends from a top edge 127 of planar strip 125 to a lower edge 126. This configuration allows the fabrication of planar strips by the method of forming grooves in the surface of a planar substrate which is subsequently divided into strips. Additionally, all reflecting facets are of equal width and, after forming, are coated in a well-known manner to provide high reflectivity for the radiation emitted by the laser diodes.

Optical beam rotator 130 is oriented, with respect to laser bar 110, such that each groove receives and rotates an incident laser beam. In this orientation, the projection of each groove vertex edge, such as vertex edge 132 of groove 131, lies at a 45° angle in the x-y plane and also forms an angle of 135° in the y-z plane of the set of laser-system xyz-coordinates 149. This orientation results in an aspect angle $\psi$ of approximately 54.7° between the w-axis of propagation of a laser beam and the vertex edge of the groove receiving the laser beam.

Because the individual laser beams are not to exhibit coherent interaction if combined, care is taken to avoid optical coupling between adjacent laser beams. To insure that there will be no such optical coupling, optical beam rotator 130 is positioned so that each laser beam is confined to a separate groove. This requires that optical beam rotator 130 be placed close enough to laser bar 110 to insure that the expanding radiation pattern from a laser beam does not fall outside its corresponding groove. For a laser array interval spacing 118 of 485 μm, the effective intergroove spacing on beam rotator 130 in the x-direction is also 485 μm. For a groove dihedral angle $\Phi$ of 60°, this results in a width of approximately 396 μm for the groove wall. This width requires careful placement of first reflecting surface 133 with respect to light-emitting plane 112. The size of laterally-collimated laser beam 180a is about 234 μm and should be completely intercepted by a reflecting surface 396 μm wide.

An advantageous feature of optical beam rotator 130 is that the planar array of grooves can be formed either by means of a cutting tool drawn across the surface of a suitable substrate or by means of replication from a master die. It should be noted that fabrication processes may produce an occasional fillet 132' or flat 139' in the groove array. To avoid the effects of such nonconformities, beam rotator 130 is preferably positioned close enough to laser bar 110 so that each laser beam covers less than the entire width of a reflecting surface.

Rotation of Laser Beams by Optical Beam Rotator 130

Optical beam rotator 130 is configured and positioned to individually reflect each incident laser beam twice. Laterally-collimated laser beam 180a, for example, is incident upon first reflecting surface 133 of beam rotator 130 and reflects to form an inverted laser beam 180b. Inverted laser beam 180b is subsequently incident upon second reflecting surface 134 and reflects to form a rotated laser beam 180c. Because rotated laser beam 180c had been collimated in the u-w plane, u-component 184c remains essentially unchanged in length from u-component 184a. In comparison, beam growth continues in the v-w plane and v-component 182c is shown as having increased in length from v-component 182a. A similar process is followed by laterally-collimated laser beam 181a, which is incident upon third reflecting surface 137 and reflects to form an inverted laser beam 181b. Inverted laser beam 181b reflects from fourth reflecting surface 138 to form a rotated laser beam 181c.

As a consequence of the two successive reflections performed on the laser beams, both laser beams 180 and 181 have been rotated 90° about their respective directions of propagation. U-component 184c of rotated laser beam 180c is now collinear with u-component 185c of rotated laser beam 181c whereas u-component 184 of laser beam 180 had been parallel to u-component 185 of laser beam 181. Likewise, the v-components 182c and 183c, of rotated laser beams 180c and 181c respectively, are parallel to one another, in contrast to v-components 182 and 183, of laser beams 180 and 181 respectively, which had been collinear. This rotation process is performed on each laser beam emitted by laser bar 110 with the consequence that the u-components of the arrayed laser beams are made to be collinear.

A secondary effect of optical beam rotator 130 is that the direction of propagation of the arrayed laser beams has also been changed by 90°. Initially, the w-axis, the direction of propagation for each laser beam, was antiparallel with the y-axis of laser-system xyz-coordinates 149. After reflection by beam rotator 130, the w-axis for rotated laser beams, shown by laser-beam uvw-coordinates 119c, is parallel to the z-axis of laser-system xyz-coordinates 149.

Converging of Laser Beam Array by Steering Lens 140

After the laser beam array has been reformatted by optical beam rotator 130, the beam array is subsequently converged into a more compact array configuration by means of a steering lens 140 as shown in FIG. 6. Steering lens is a cylindrical lens with curvature in the xz-plane and a focal length of about 10.4 mm. The effect of steering lens on the laser beam array can be seen by a comparison of FIG. 9, which shows adjacent rotated laser beams 180c and 181c before passing into lens 140, and FIG. 10, which shows adjacent converging laser beams 180d and 181d after passing through lens 140.

Figure 9:
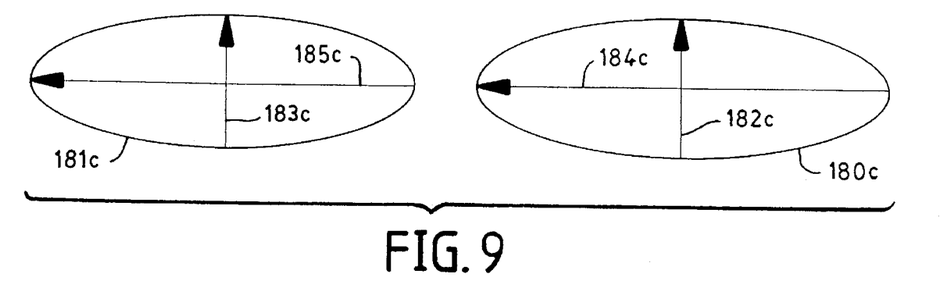
FIG. 9 is a diagrammatic graphical representation of the distribution patterns of a pair of laser light beams, emitted by the laser bar of FIG. 6, as seen after beam reformatting performed by the beam rotator of FIG. 8.

In FIG. 9, u-components 184c and 185c, of rotated laser beams 180c and 181c respectively, are about 240 μm in length, and v-components 182c and 183c are about 320 μm in length. Rotated laser beams 180c and 181c have a center-to-center spacing of about 485 μm, the same as the array interval spacing 118 of FIG. 8.

Figure 10:
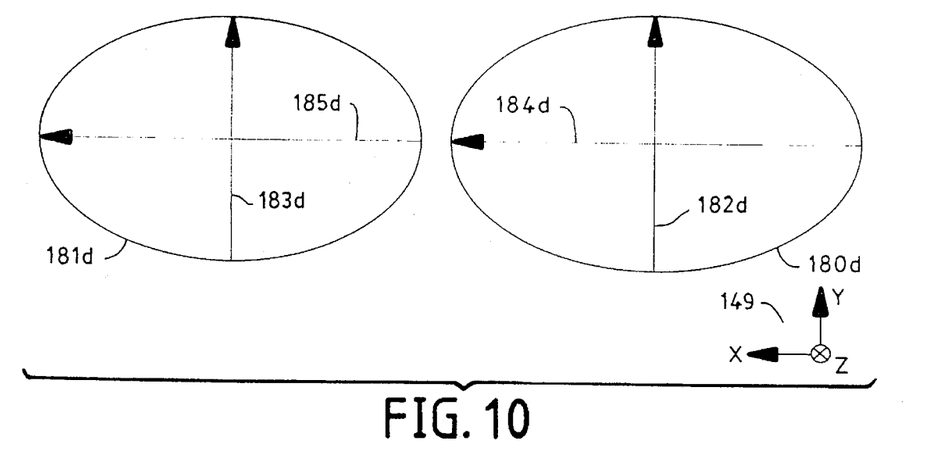
FIG. 10 is a diagrammatic graphical representation of the distribution pattern of a pair of laser light beams, emitted by the laser bar of FIG. 6, as seen after passage into the focusing optics of FIG. 6.

In FIG. 10, u-components 184d and 185d, of converging laser beams 180d and 181d respectively, have not increased in size and remain about 240 μm in length. V-components 182d and 183d continue to grow while the inter-beam spacing of converging laser beams 180d and 181d decreases because of the convergent effect of steering lens 140.

Transverse Collimation and Focusing of Laser Beam Array

Converging laser beams 180d and 181d pass into a standard afocal telescopic optic pair of lenses comprised of second collimating lens 150 and focusing lens 160. The laser beams are then collimated in the second azimuth by means of second collimating lens 150. Lens 150 is a cylindrical lens, with curvature in the yz-plane, with a focal length of about 4.7 mm. Focusing lens 160 is a cylindrical lens, also with curvature in the yz-plane, with a focal length of about 2.35 mm. Lenses 150 and 160 act to collimate the laser beam array in the transverse, or y-axis, direction and to demagnify the laser beams by a factor of 0.5.

Figure 11:
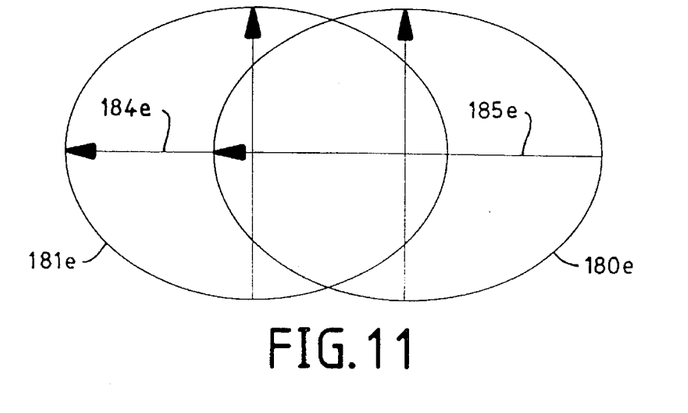
FIG. 11 is a diagrammatic graphical representation of the distribution patterns of a pair of laser light beams, emitted by the laser bar of FIG. 6, as seen prior to emergence from the focusing optics of FIG. 6.

FIG. 11 illustrates how the center-to-center spacing of collimated laser beams 180e and 181e continues to decrease so that the individual beams begin to overlap one another. U-components 184e and 185e remain approximately 240 μm in length. The array of laser beams, including collimated laser beams 180e and 181e, subsequently pass through focusing lens 160 to produce focused beam 190.

Focused beam 190 is a compact, high-power laser light which is positioned to strike a predetermined target area, such as a waveguide section 172 of optical fiber 170. Beam 190 propagates along waveguide section 172 where it is laterally coupled into an optical fiber gain core 174.

Alternative Embodiments

Figure 12:
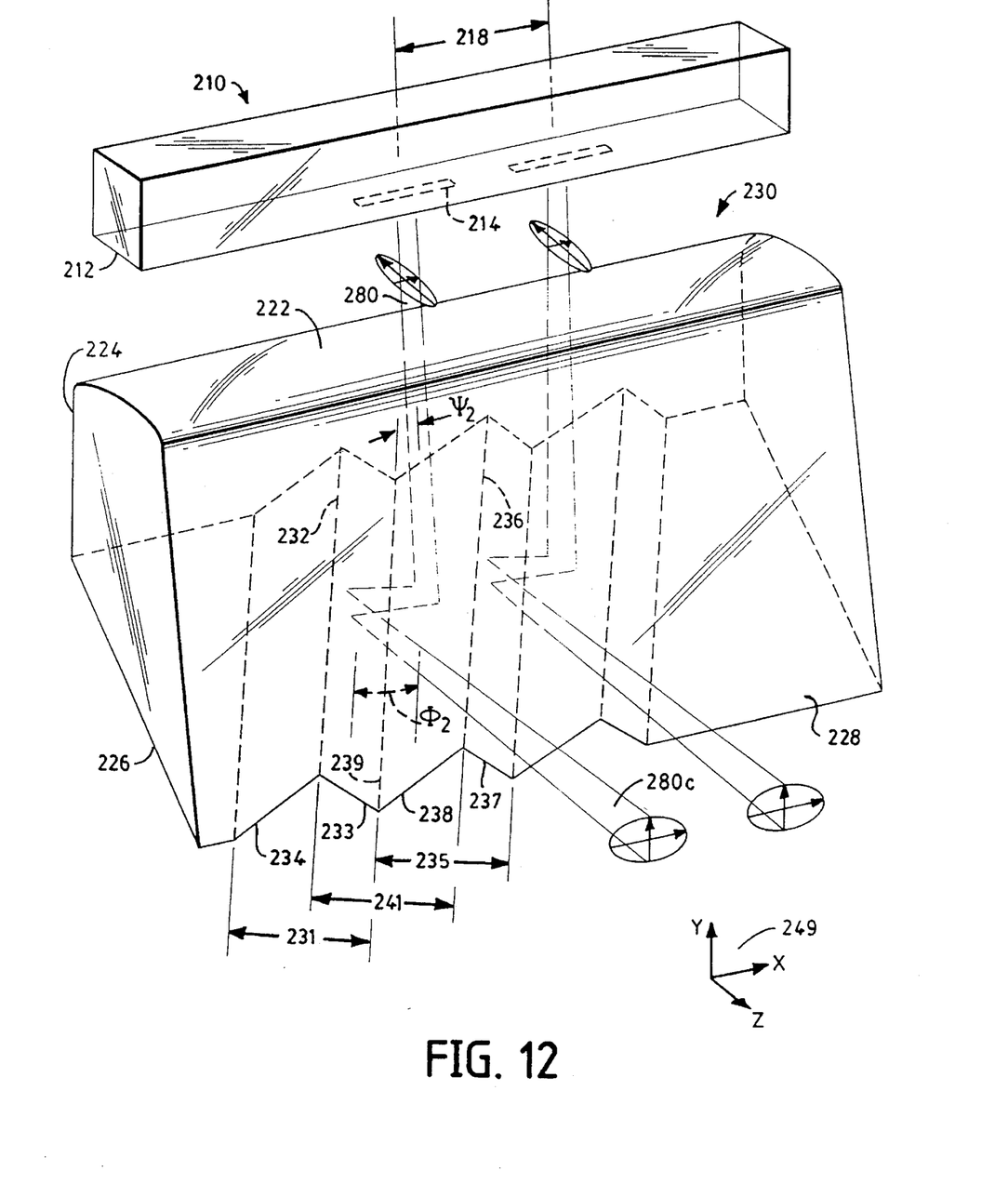
FIG. 12 is a diagrammatic detailed perspective view of a portion of an alternative embodiment of the optical system of FIG. 6 and shows an integral beam collimating and rotating device.

In an alternative embodiment, beam rotator 130 and collimating lens 120 are combined into a monolithic beam rotator 230 as shown in FIG. 12. Monolithic beam rotator 230 is formed from an optically-transparent material, such as glass or plastic and incorporates a cylindrical surface 222 which acts to collimate the laser beams 280 in a manner similar to lateral beam-collimating lens 120 in the embodiment described above. Preferably, the material selected is largely transparent to IR and near-IR wavelengths so as to avoid thermal effects in beam rotator 230.

An array of contiguous vee-shaped grooves, such as grooves 231 and 235, are formed in an oblique surface 226 which extends from a back side 224 to a front side 228 of monolithic beam rotator 230. Groove 231 is comprised of a first reflecting surface 233 and a second reflecting surface 234. Reflecting surfaces 233 and 234 are formed by planar boundaries between the optical-transparent material and an ambient medium. Reflection at these boundaries occurs because the optically-transparent material has an index of refraction $n_2$ larger than the index of refraction $n_1$ of air, which is the usual ambient medium.

Reflecting surfaces 233 and 234 are in opposed relationship to one another and meet at a common line of intersection, vertex edge 232. Adjacent to groove 231 is a groove 235 comprised of a third reflecting surface 237 and a fourth reflecting surface 238 which meet at a vertex edge 236. Preferably, all reflecting surfaces are of equal width. The grooves in the array are all similarly oriented so that alternating reflecting surfaces, such as first reflecting surface 233 and third reflecting surface 237, (or second reflecting surface 234 and fourth reflecting surface 238) are parallel to one another.

Reflecting surfaces 233 and 238 meet at a common line of intersection to form a concave reflecting pair 241 defining a dihedral angle $\Phi_2$ with an apex edge 239. A laser bar 210 emits laser beams 280 from an array of laser diodes 214. Each reflecting pair 241 in beam rotator 230 is configured and positioned to intercept and internally reflect one of the corresponding incident laser beams 280. Beam rotator 230 is oriented such that each apex edge 239 lies at a 45° angle in the x-y plane and also forms an angle of 135° in the y-z plane of the set of laser-system xyz-coordinates 249. This results in an aspect angle $\psi_2$ of approximately 54.7° between the w-axis of propagation of laser beam 280 and apex edge 239 common to reflecting surfaces 238 and 233 reflecting laser beam 280. Upon passing integral beam rotator 230, laser beam 280 is rotated 90° to produce rotated laser beam 280c in a manner similar to the rotation of laser beam 180 described above.

Care is taken to avoid optical coupling between adjacent laser beams. To insure that there will be no such optical coupling, optical beam rotator 230 is positioned so that each laser beam is confined to a separate reflecting pair using the same analysis applied to preferred embodiment optical beam rotator 130 above.

The planar array of surface grooves can be readily formed by means of a cutting tool drawn from back side 224, across oblique surface 226, and terminating at front side 228 of integral beam rotator 230. Alternatively, the integral beam rotator can be molded from a plastic material.

Figure 13:
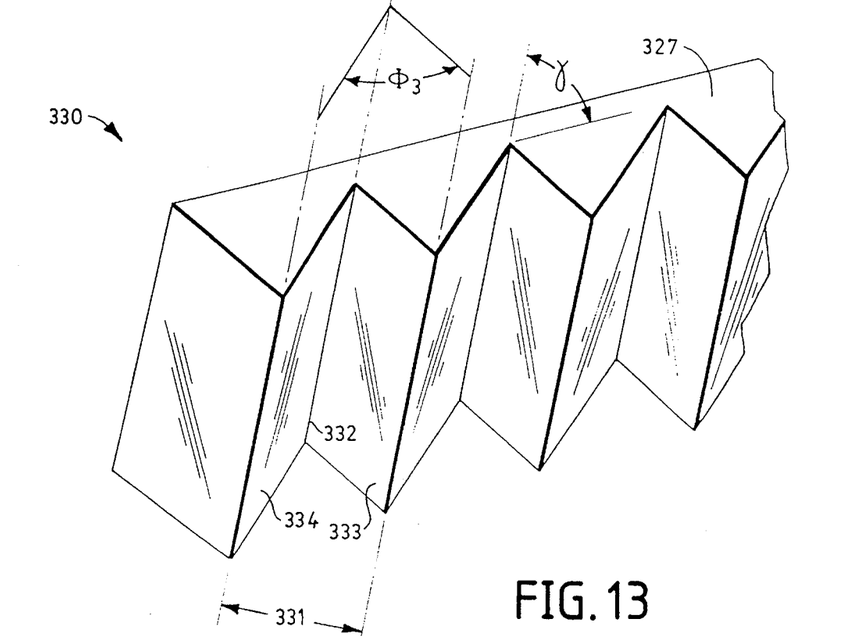
FIG. 13 is a diagrammatic perspective view of an alternative embodiment of the optical beam rotating device of FIG. 8, comprising a strip of monocrystalline substance having an array of grooves etched into one surface.

In an alternative embodiment, an etched beam rotator 330, shown in FIG. 13, is fabricated from a strip cut from an etched wafer of a monocrystalline substance such as silicon or gallium arsenide. An array of grooves 331 is etched into the wafer before the strips are cut. By using an appropriate monocrystalline substance, the array of grooves can be formed by selective etching, as is well-known in the art. For silicon, the strips are cut so that the angle $\gamma$, formed by a groove vertex edge 332 and a long edge 327 of the etched beam rotator 330, is approximately 48.6°.

The groove angle of the etched grooves depends upon the crystal lattice properties of the substance being etched. For example, given a (100) oriented silicon wafer approximately 525 μm thick, grooves having a first reflecting facet 333 in the (111) plane and a second reflecting facet 334 in the ($\bar{1}\,\bar{1}\,1$) plane are formed. Facets 333 and 334 lie in opposed relationship to one another and meet at a common line of intersection, vertex edge 332, to form a dihedral angle $\Phi_3$ of approximately 70.5°. Additionally, the grooves are oriented parallel to a wafer reference flat lying in a (011) reference plane.

Figure 14:
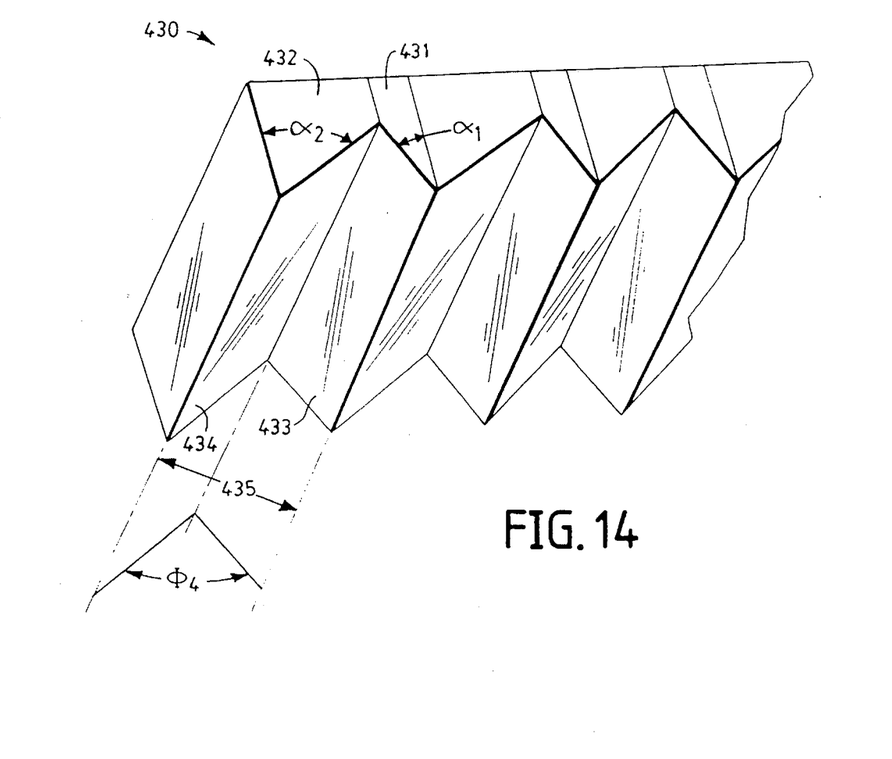
FIG. 14 is a diagrammatic perspective view of yet another embodiment of the optical beam rotating device of FIG. 8, comprising a plurality of stacked plates, where each stacked plate has an angled, or wedged, end.

In yet another embodiment, a plurality of flat plates, tapered or wedged at one end, are stacked and cut to form grooved strips. One such wedged plate is provided for each reflecting surface. FIG. 14 shows a stacked beam rotator 430 comprising a series of wedged plates, such as first wedged plate 431 and second wedged plate 432. A reflecting facet 433 forms an angle $\alpha_1$ with plate 431, and a reflecting facet 434 forms an angle $\alpha_2$ with plate 432, such that the stacking of the plates results in a groove 435 forming a dihedral angle $\Phi_4$ of 60°.

While there have been described preferred embodiments of the present invention, it will be readily apparent to those skilled in the art that various changes and modifications may be made therein without departing from the invention, and it is intended in the wording of the appended claims to include such changes and modifications as would be encompassed by the true spirit and scope of the invention.

What is claimed is:

1. An optical apparatus for optically rotating light beams in a beam array, said apparatus comprising:

a plurality of light sources, each said light source producing a light beam having divergence defined both in a first azimuthal direction orthogonal to the direction of propagation and in a second azimuthal direction orthogonal both to the direction of propagation and to the first azimuthal direction, said light beams oriented such that their respective first azimuthal directions are substantially parallel to one another; and a substrate having a grooved surface, said grooved surface comprising a plurality of adjacent grooves having at least a one-to-one correspondence with the light beams to be rotated, each said groove being formed of first and second reflecting surfaces which intersect along a common vertex edge and form a dihedral angle ($\Phi$) between them, each said groove vertex edge being oriented at an aspect angle ($\psi$) with respect to the direction of propagation of the corresponding light beam so that said first reflecting surface is positioned to intercept the corresponding light beam and to direct it as an inverted beam to said second reflecting surface along a first path of travel, that is folded with respect to the direction of propagation, while said second reflecting surface operates to intercept the inverted beam reflected off said first reflecting surface and to direct it as a rotated beam along a second path of travel, folded with respect to said first path of travel, said rotated beams acquiring an orientation such that their respective second azimuthal directions are substantially parallel to one another.

2. The optical apparatus of claim 1 wherein said first reflecting surface intersects along a common apex edge with the second said reflecting surface of an adjacent groove to form a reflecting pair defining a dihedral angle, ($\Phi_2$) between them.

3. The optical apparatus of claim 1 wherein all said first reflecting surfaces are parallel to one another and all said second reflecting surfaces are parallel to one another.

4. The optical apparatus of claim 1 wherein said reflecting surfaces are of essentially the same width.

5. The optical apparatus of claim 1 wherein said vertex edges are parallel to one another.

6. The optical apparatus of claim 1 wherein said dihedral angle ($\Phi$) is substantially 60°.

7. The optical apparatus of claim 6 wherein said aspect angle ($\psi$) is substantially 54.7°.

8. The optical apparatus of claim 1 wherein said substrate comprises a monocrystalline substance.

9. The optical apparatus of claim 8 wherein said monocrystalline substance comprises silicon.

10. The optical apparatus of claim 9 wherein said dihedral angle ($\Phi$) is substantially 70.5°.

11. The optical apparatus of claim 8 wherein said monocrystalline substance comprises gallium arsenide.

12. The optical apparatus of claim 1 wherein said reflecting surfaces comprise a coating to increase the reflection of the light beam by said reflecting surfaces.

13. The optical apparatus of claim 2 wherein said substrate comprises an optically-transparent material having an index of refraction $n_2 > n_1$, where $n_1$ is the index of refraction of the ambient medium, such that internal reflections occur within said material at said reflecting surfaces.

14. The optical apparatus of claim 13 wherein all said first reflecting surfaces are parallel to one another and all said second reflecting surfaces are parallel to one another.

15. The optical apparatus of claim 13 wherein said reflecting surfaces are of essentially the same width.

16. The optical apparatus of claim 13 wherein said apex edges are parallel to one another.

17. The optical apparatus of claim 13 wherein said dihedral angle ($\Phi_2$) is substantially 60°.

18. The optical apparatus of claim 17 wherein said aspect angle ($\psi$) is substantially 54.7°.

19. The optical apparatus of claim 13 wherein said material is comprised of glass transparent to infrared wavelengths.

20. The optical apparatus of claim 13 further comprising means for collimating said light beams in at least one azimuthal direction.

21. An optical apparatus for optically rotating light beams in a beam array, said apparatus comprising:

a plurality of light sources, each said light source producing a light beam having divergence defined both in a first azimuthal direction orthogonal to the direction of propagation and in a second azimuthal direction orthogonal both to the direction of propagation and to the first azimuthal direction, said light beams oriented such that their respective first azimuthal directions are substantially parallel to one another; and a plurality of flat plates, each said plate having a sloping surface extending from a surface of said plate to an edge of said plate, said plurality of plates being stacked in a linear array such that alternating pairs of said plates are positioned with corresponding sloping surfaces in opposed relationship to one another, each said opposed sloping surface pair forming a concave reflecting pair defining a dihedral angle of ($\Phi$) said dihedral angle having a vertex edge common to both said sloping surfaces in said reflecting pair, each said reflecting pair further having a one-to-one correspondence with the optical beams to be rotated, each said reflecting pair vertex edge being oriented at an aspect angle ($\psi$) with respect to the direction of propagation of the corresponding light beam so that one of said sloping surfaces in said reflecting pair is positioned to intercept the corresponding light beam and to direct it as an inverted beam to the other of the said sloping surfaces in the reflecting pair along a first path of travel, that is folded with respect to the direction of propagation, while said other of the sloping surfaces operates to intercept the inverted beam reflected off said one of said sloping surfaces and to direct it as a rotated beam along a second path of travel, said rotated beams acquiring an orientation such that their respective second azimuthal directions are substantially parallel to one another.

22. The optical apparatus of claim 21 wherein said dihedral angle ($\Phi$) is substantially 60°.

23. An optical coupler for converting an incoming array of light beams into a single beam of optical radiation, comprising:

first means for collimating each light beam along a first azimuth, to decrease the growth of the light beam in a first azimuth as the beam passes through said first means for collimating and remains decreased in said first azimuth as the beam continues to propagate through said optical coupler;

an optical beam rotator for transforming the array of light beams, said beam rotator comprising:

a substrate having a grooved surface, said grooved surface comprising a plurality of adjacent grooves having a one-to-one correspondence with the light beams to be transformed, each said groove being formed of first and second reflecting surfaces which intersect along a common vertex edge and form a dihedral angle ($\Phi$) between them, the said vertex edge of each said groove being oriented at an aspect angle ($\psi$) with respect to the initial direction of propagation of the corresponding light beam so that said first reflecting surface is positioned to intercept the incoming beam and to direct it to said second reflecting surface along a first path of travel, that is folded with respect to the incoming beam direction of propagation, while rotating one of the beam's azimuths, while said second reflecting surface operates to intercept the beam reflected off said first surface and to direct it along a second path of travel, folded with respect to said first path of travel, while rotating the light beam's other azimuth, whereby the horizontal and vertical components of the initial orientation of the light beam are interchanged;

second means for collimating each light beam along a second azimuth, to decrease the growth of the light beam in said second azimuth as the beam passes through said second means for collimating and remains decreased in said second azimuth as the beam continues to propagate through said optical coupler, said second azimuth being orthogonal both to the direction of propagation of the light beam and to said first azimuth; and means for converging the array of light beams so that the array strikes a predetermined target area.

24. The optical convertor of claim 23 wherein said dihedral angle ($\Phi$) is substantially 60°.

25. The optical convertor of claim 23 wherein said substrate comprises a monocrystalline substrate.

26. The optical convertor of claim 25 wherein said monocrystalline substrate comprises silicon.

27. The optical convertor of claim 26 wherein said dihedral angle ($\Phi$) is substantially 70.5°.

28. The optical convertor of claim 25 wherein said monocrystalline substance comprises gallium arsenide.

29. An optical coupler for converting an incoming array of optical beams into a single beam of optical radiation, comprising:

a monolithic optical beam rotator for transforming the array of optical beams, said optical beam rotator comprising an optically-transparent material having an index of refraction $n_2 > n_1$, where $n_1$ is the index of refraction of the ambient medium, said optical beam rotator having a cylindrical surface, for collimating each incoming optical beam along a first azimuth, to decrease the growth of the optical beam in said first azimuth as the beam passes through said cylindrical surface, and remains decreased in said first azimuth as the beam emerges from said optical beam rotator and continues to propagate through said optical coupler, said optical beam rotator further having a grooved surface, said grooved surface comprising a plurality of adjacent grooves, each said groove being formed of first and second reflecting surfaces, said first reflecting surface intersecting along a common apex edge with the second said reflecting surface of an adjacent groove to form a concave reflecting pair defining a dihedral angle ($\Phi_2$) between them, each said reflecting pair having a one-to-one correspondence with the optical beams to be transformed, the said apex edge of each said reflecting pair being oriented at an aspect angle ($\psi$) with respect to the initial direction of propagation of the corresponding optical beam so that said first reflecting surface is positioned to intercept the incoming beam and to direct it to said second reflecting surface along a first path of travel, that is folded with respect to the incoming beam direction of propagation, while rotating one of the beam's azimuths, while said second reflecting surface operates to intercept the beam reflected off said first surface and to direct it along a second path of travel, folded with respect to said first path of travel, while rotating the optical beam's other azimuth, whereby the horizontal and vertical components of the initial orientation of the optical beam are interchanged;

means for collimating each optical beam along a second azimuth, to decrease the growth of the optical beam in said second azimuth as the beam passes through said means for collimating and remains decreased in said second azimuth as the beam continues to propagate through said optical coupler, said second azimuth being orthogonal both to the direction of propagation of the optical beam and to said first azimuth; and means for converging the array of optical beams so that the array strikes a predetermined target area.

30. The optical coupler of claim 29 wherein said dihedral angle ($\Phi_2$) is substantially 60°.

31. An optical coupler for converting an incoming array of optical beams into a single beam of optical radiation, comprising:

first means for collimating each optical beam along a first azimuth, to decrease the growth of the optical beam in said first azimuth as the optical beam passes through said first means for collimating and remains decreased in said first azimuth as the optical beam continues to propagate through said optical coupler;

an optical beam rotator comprising:

a plurality of flat plates, each said plate having a sloping surface extending from a surface of said plate to an edge of said plate, said plurality of plates being stacked in a linear array such that alternating pairs of said plates are positioned with corresponding sloping surfaces in opposed relationship to one another, each said opposed sloping surface pair forming a concave reflecting pair defining a dihedral angle ($\Phi$) said dihedral angle having a vertex edge common to both said sloping surfaces in said reflecting pair, each said reflecting pair further having at least a one-to-one correspondence with the optical beams to be rotated, said vertex edge of each said reflecting pair being oriented at an aspect angle ($\psi$) with respect to the incoming direction of propagation of the corresponding optical beam so that one of the said sloping surfaces in said reflecting pair is positioned to intercept the incoming optical beam and to direct it as an inverted beam to the other of the said sloping surfaces in the reflecting pair along a first path of travel, that is folded with respect to the incoming direction of propagation, while said other of the sloping surfaces operates to intercept the inverted beam reflected off said one of said sloping surfaces and to direct it as a rotated beam along a second path of travel, folded with respect to said first path of travel; and means for converging the rotated beams to strike a predetermined target area.

32. The optical coupler of claim 31 wherein said dihedral angle ($\Phi$) is substantially 60°.

\* \* \* \* \*